(12) United States Patent
Yaguchi

(10) Patent No.: US 8,255,433 B2
(45) Date of Patent: Aug. 28, 2012

(54) RECORDER

(75) Inventor: Yoshitaka Yaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 496 days.

(21) Appl. No.: 12/434,698

(22) Filed: May 4, 2009

(65) Prior Publication Data

US 2009/0282082 A1 Nov. 12, 2009

(30) Foreign Application Priority Data

May 8, 2008 (JP) ................................. 2008-121950

(51) Int. Cl.
*G06F 7/00* (2006.01)
*G06F 17/30* (2006.01)
(52) U.S. Cl. ........................................................ 707/812
(58) Field of Classification Search .......... 707/600–831; 711/102–104, 142, 143, 155; 369/321, 30.04, 369/30.2, 30.28, 30.32, 34.01, 272.1
See application file for complete search history.

(56) References Cited

U.S. PATENT DOCUMENTS

| | | | |
|---|---|---|---|
| 8,020,212 B2 * | 9/2011 | Takashima | 726/27 |
| 2002/0103860 A1 | 8/2002 | Terada et al. | |
| 2003/0174549 A1 * | 9/2003 | Yaguchi et al. | 365/200 |
| 2006/0195911 A1 * | 8/2006 | Takashima | 726/27 |

FOREIGN PATENT DOCUMENTS

| | | |
|---|---|---|
| EP | 1758334 A1 * | 2/2007 |
| JP | 2002-229889 | 8/2002 |

OTHER PUBLICATIONS

Hong Li et al., A scalable HDD video recording solution using a real-time file system, Jun. 17, 2003, 663-669.*

* cited by examiner

*Primary Examiner* — Jean B Fleurantin
(74) *Attorney, Agent, or Firm* — Renner, Otto, Boisselle & Sklar

(57) ABSTRACT

A recorder according to the present invention is designed to record data files, including video data and/or audio data, on a storage medium. The recorder includes: a status detecting section for determining whether or not the recorder is in a non-recording status in which the recorder is performing no recording operations; and a processing section for performing, as soon as the non-recording status is detected, processing to get ready to transmit at least one data file, which was recorded on the storage medium at or after a predetermined reference time, toward a server and generating at least one data file to transmit. The processing section performs at least one of format conversion processing and aggregation processing of aggregating multiple data files together.

16 Claims, 8 Drawing Sheets

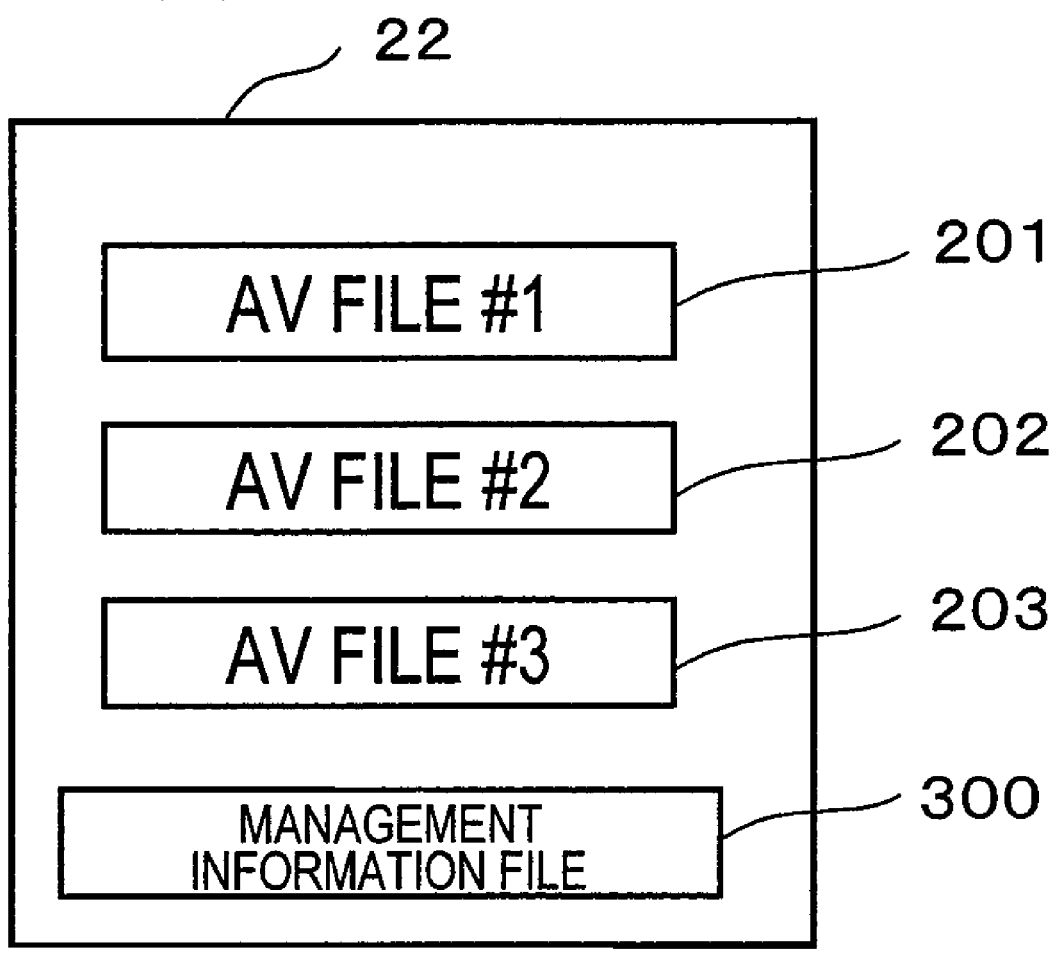

FIG.4

| AV FILE NO. | FRAME RATE | SCANNING METHOD | NUMBER OF HORIZON-TAL PIXELS | NUMBER OF VERTICAL PIXELS | MOVING PICTURE ENCODING METHOD | AUDIO ENCODING METHOD | DATE OF FILE CREATION | AGGREGA-TION/CON-VERSION FLAG | UPLOAD COMPLETE FLAG | UPLOAD-ABILITY FLAG |
|---|---|---|---|---|---|---|---|---|---|---|
| AV FILE #1 | 60Hz | PROGRESSIVE | 1280 | 720 | MPEG2 | MPEG1 Audio Layer2 | SEP. 1, 2005 | 1 | 1 | ○ |
| AV FILE #2 | 30Hz | INTERLACED | 1920 | 1080 | MPEG4 -AVC | Dolby AC-3 Dolby AC-3 | SEP. 5, 2005 | 0 | 0 | ○ |
| AV FILE #3 | 30Hz | INTERLACED | 720 | 480 | MPEG4 -AVC | Dolby AC-3 | SEP. 9, 2005 | 0 | 0 | ○ |

300

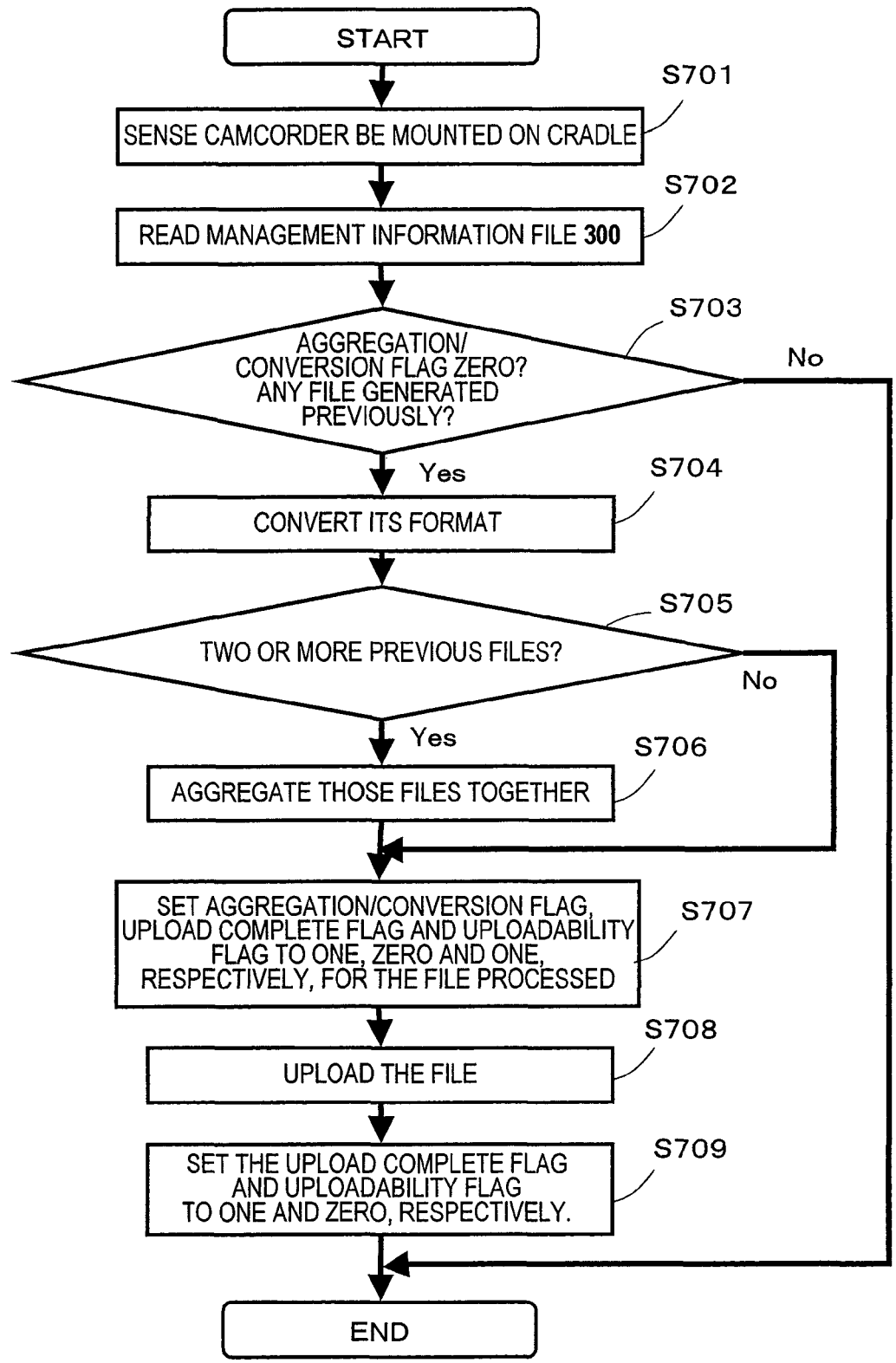

FIG. 7

| AV FILE NO. | FRAME RATE | SCANNING METHOD | NUMBER OF HORIZON- TAL PIXELS | NUMBER OF VERTICAL PIXELS | MOVING PICTURE ENCODING METHOD | AUDIO ENCODING METHOD | DATE OF FILE CREATION | AGGREGA-TION/CON- VERSION FLAG | UPLOAD COMPLETE FLAG | UPLOAD- ABILITY FLAG |
|---|---|---|---|---|---|---|---|---|---|---|
| AV FILE #1 | 60Hz | PROGRESSIVE | 1280 | 720 | MPEG2 | MPEG1 Audio Layer2 | SEP. 1, 2005 | 1 | 1 | 0 |
| AV FILE #4 | 30Hz | INTERLACED | 1280 | 720 | MPEG4-AVC | Dolby AC-3 | SEP. 9, 2005 | 1 | 0 | 1 |

| AV FILE NO. | FRAME RATE | SCANNING METHOD | NUMBER OF HORIZON-TAL PIXELS | NUMBER OF VERTICAL PIXELS | MOVING PICTURE ENCODING METHOD | AUDIO ENCODING METHOD | DATE OF FILE CREATION | AGGREGA-TION/CON-VERSION FLAG | UPLOAD COMPLETE FLAG | UPLOAD-ABILITY FLAG |
|---|---|---|---|---|---|---|---|---|---|---|
| AV FILE #1 | 60Hz | PROGRESSIVE | 1280 | 720 | MPEG2 | MPEG1 Audio Layer2 | SEP. 1, 2005 | 1 | 1 | 0 |
| AV FILE #4 | 30Hz | INTERLACED | 1280 | 720 | MPEG4-AVC | Dolby AC-3 | SEP. 9, 2005 | 1 | 1 | 0 |

600

RECORDER

BACKGROUND OF THE INVENTION

1. Field of the Invention

The present invention generally relates to a technique for writing content data such as moving picture data or audio data on a storage medium. More particularly, the present invention relates to a technique for writing data that has been obtained with a camcorder, a digital camera with a moving picture shooting function, or a cellphone with a built-in camera.

2. Description of the Related Art

Recently, various types of camcorders for writing audiovisual (AV) data, including video data and audio data, on a randomly accessible storage medium such as an optical disc or a flash memory (which will be referred to herein as a "random access medium") have been proposed.

Such a camcorder generates a file every time a recording session, which starts at a writing start point and ends at a writing end point, is done. A group of those files generated is treated as a group of nonlinear files on a random access medium.

That is why if recording sessions are performed numerous times using such a random access medium, then a lot of files will be generated on the random access medium. In this respect, the random access medium is quite different from the conventional tape medium on which data is written linearly.

Nevertheless, some inconveniences will be caused by the generation of such a lot of files as a result of recording sessions. For example, if the user has performed recording sessions numerous times to shoot his or her child's play on a field day, then a lot of moving picture files will be generated. In that case, when the user copies those series of moving picture files, containing his or her child's field day shots, from a random access medium to another storage medium, he or she usually has to select his or her desired files one by one from the random access medium, which is a very time-consuming job for him or her.

Also, recently, moving picture upload sites on the Internet have attracted increasing attention, and people save their data in a data storage space on the network more and more often. However, in saving those moving picture data files and/or uploading those files to an AV server with a broadcast function to use those services, the user also usually needs to select and upload a lot of files he or she likes, which is very much troublesome for him or her. On top of that, when the user wants to view and/or listen to a moving picture consisting of those uploaded files as a content on the AV server, he or she has to select his or her desired files from a huge number of moving picture files, which cannot get done easily, either.

Generally speaking, the more quickly an upload can get done, the better for users. That is why to get the search done more quickly, Japanese Patent Application Laid-Open Publication No. 2002-229889 teaches a technique for automatically sensing an electronic camera be mounted on a cradle and starting an image processing program. Then, the image data will be transmitted from a PC toward the service center's server over the Net.

According to the method of Japanese Patent Application Laid-Open Publication No. 2002-229889, however, if a lot of moving picture files were uploaded to an AV server, the user should also look through those many moving picture files in the AV server to find his or her desired content, thus making it difficult to select his or her desired content quickly. That is to say, that method cannot contribute to getting the search done quickly in such a situation.

It is therefore an object of the present invention to provide a recorder that can process data files on the supposition that those files will be uploaded to a server and that makes it easier to select and play those data files before and after the files are uploaded.

SUMMARY OF THE INVENTION

A recorder according to the present invention is designed to record data files, including video data and/or audio data, on a storage medium. The recorder includes: a status detecting section for determining whether or not the recorder is in a non-recording status in which the recorder is performing no recording operations; and a processing section for performing, as soon as the non-recording status is detected, processing to get ready to transmit at least one data file, which was recorded on the storage medium at or after a predetermined reference time, toward a server and generating at least one data file to transmit. The processing section performs at least one of format conversion processing and aggregation processing of aggregating multiple data files together.

In one preferred embodiment, the recorder further includes a recording section for recording the at least one data file to transmit on the storage medium.

In another preferred embodiment, the recorder further includes a transmitting section for transmitting the at least one data file to transmit toward the server.

In this particular preferred embodiment, the processing section performs the format conversion processing on the at least one data file as the processing to get ready to transmit the data file toward the server.

In a specific preferred embodiment, the at least one data file includes multiple data files. The processing section performs the aggregation processing of aggregating the multiple data files as the processing to get ready to transmit the data files toward the server, thereby generating the at least one data file to transmit. The number of files included in the at least one data file to transmit is smaller than that of the multiple data files.

In that case, the file size of the at least one data file to transmit is smaller than that of the multiple data files.

In another preferred embodiment, on the storage medium, management information is stored in each of the multiple data files. The management information includes processing state information indicating whether or not one of the conversion processing and the aggregation processing has been performed on each said data file. In accordance with the processing state information, the processing section performs the processing to get ready to transmit it to the server on a data file on which neither the aggregation processing nor the conversion processing has been performed.

In this particular preferred embodiment, the management information includes transmission ready information indicating that the data file is ready to be transmitted to the server. The transmitting section transmits one of the data files, which has been identified by reference to the transmission ready information, toward the server.

In a specific preferred embodiment, the management information includes transmission result information indicating whether or not the data file has been transmitted toward the server successfully. When one of the data files is transmitted successfully toward the server, the processing section changes the values of the transmission result information about that data file into a value indicating that the transmission is complete.

In still another preferred embodiment, the reference time is a point in time when the at least one data file was transmitted toward the server last time. The processing section performs the processing to get ready to transmit it toward the server on at least one data file that has been recorded on the storage medium after the previous data file was transmitted toward the server last time.

In yet another preferred embodiment, the processing section changes the formats of the at least one data file into a format compatible with the server.

In this particular preferred embodiment, the at least one data file includes video data. The processing section changes the formats of video represented by the video data in at least one of the frame rate, scanning method, number of vertical pixels, number of horizontal pixels, and video data encoding method thereof.

In another preferred embodiment, the at least one data file includes audio data. The processing section changes the formats of the audio data in at least one of the encoding method and encoding bit rate thereof.

In yet another preferred embodiment, the status detecting section is able to determine whether or not the recorder is performing a recording operation. On sensing that no recording operation has been performed for at least a certain amount of time, the status detecting section determines that the recorder is in the non-recording status.

In yet another preferred embodiment, the status detecting section is able to sense the recorder be mounted on a cradle. On sensing the recorder be mounted on the cradle, the status detecting section determines that the recorder is in the non-recording status.

In yet another preferred embodiment, the status detecting section is able to sense the recorder be connected to a network. On sensing the recorder be connected to the network, the status detecting section determines that the recorder is in the non-recording status.

In yet another preferred embodiment, the recorder further includes an operating section that allows the user to switch the recorder into the non-recording status. On sensing the operating section be manipulated, the status detecting section determines that the recorder is in the non-recording status.

A recorder according to the present invention carries out processing of transmitting one or multiple data files of audio and/or video data toward a server, thereby generating data file(s) to transmit. If there is only one data file to transmit, the recorder performs conversion processing to convert the format or the size of the data file into what is compatible with the server. On the other hand, if there are a number of data files to transmit, then the recorder performs the conversion processing and/or aggregation processing to aggregate the multiple data files together. Since an appropriate number of data file(s) to transmit can be generated in a format compatible with the server without using a PC, the data file(s) can be uploaded easily. On top of that, if the data file(s) is/are uploaded that way, the selection and playback of any content can be done smoothly in terms of both format and number of data files alike.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3 illustrates AV files #1 (201), #2 (202) and #3 (203) and a management information file 300 that are stored on a memory card 22.

FIG. 4 summarizes various pieces of management information about the AV files #1 (201), #2 (202) and #3 (203), which are stored in the management information file 300.

FIG. 5 is a flowchart showing the procedure of operation of the camcorder 100.

FIG. 7 shows exemplary contents of a management information file 400 after the aggregation processing has been performed.

FIG. 8 shows the contents of a management information file 600, of which the management information has been updated after the AV file #4 (401) has been uploaded.

DETAILED DESCRIPTION OF PREFERRED EMBODIMENTS

Hereinafter, preferred embodiments of a recorder according to the present invention will be described with reference to the accompanying drawings.

A recorder according to the present invention may be implemented as a video recorder for recording video and audio or an audio recorder for recording audio only. In the following description of preferred embodiments, a recorder according to the present invention is supposed to be implemented as a camcorder. However, the present invention can be naturally implemented as a voice recorder by omitting the video processing system components from the camcorder to be described below.

Figure 1:
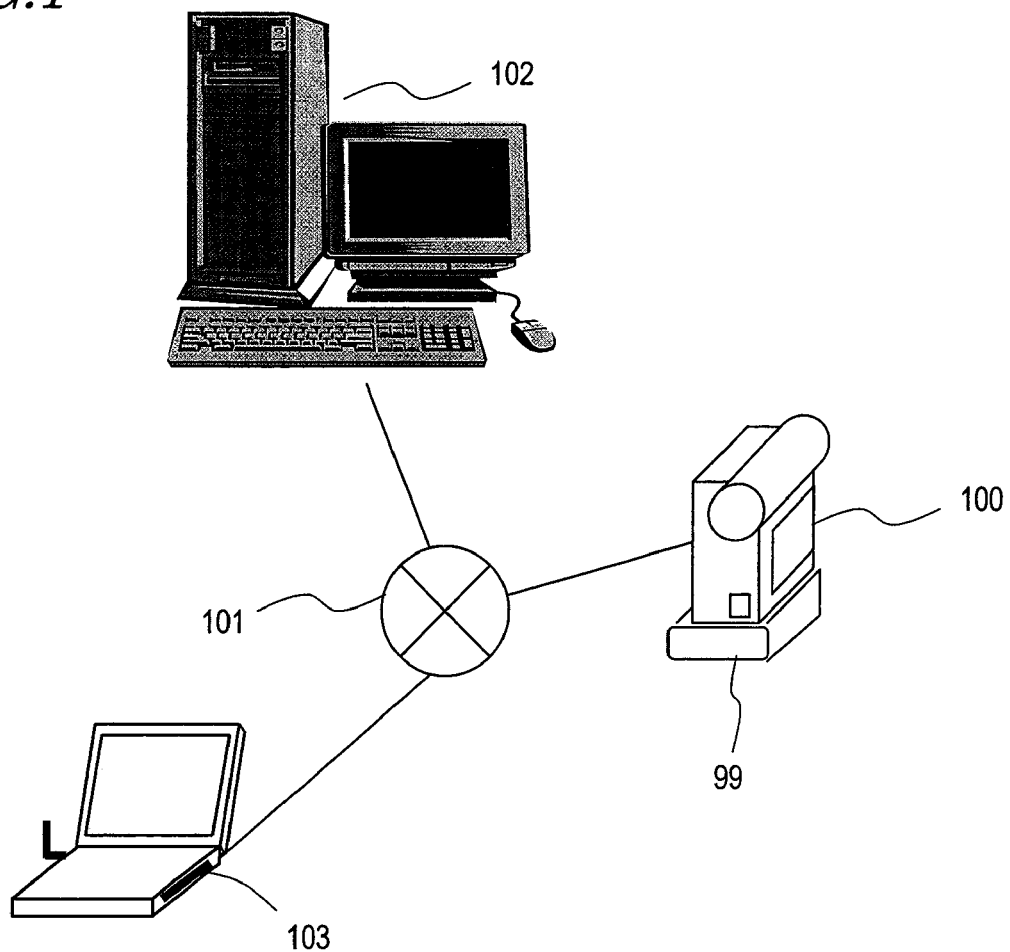
FIG. 1 illustrates a network environment in which a camcorder 100 as a specific preferred embodiment of the present invention may be used.

FIG. 1 illustrates a network environment in which a camcorder 100 as a specific preferred embodiment of the present invention may be used. The camcorder 100 has a network adapter in itself and is connected to the network 101, which is illustrated as further linking together an AV server 102 and a player 103 for reproducing the moving picture data provided by the AV server 102.

A camcorder 100 according to this preferred embodiment can transmit (which will also be referred to herein as "upload") a data file including video data and audio data, which have been written on a storage medium as a result of a shooting session, toward the AV server 102.

Specifically, the transmitting operation can be done in the following manner. On sensing itself be mounted on a cradle 99, which functions as a charger, the camcorder 100 performs processing to get ready to transmit a data file, which was recorded on the storage medium at or after a predetermined reference time, toward the AV server 102. In this case, the "predetermined reference time" may be a point in time when the previous data file was transmitted toward the server, for example.

More specifically, if there are a number of data files to process, the CPU (to be described later) of the camcorder 100 carries out not only conversion processing to match their formats together but also aggregation processing to aggregate together those data files into a single data file to transmit. On the other hand, if there is only one data file to process, then the CPU of the camcorder 100 performs only the conversion processing.

The data file(s) processed is/are stored on a storage medium and then transmitted toward the AV server 102 over the network 101. As a result, data file(s), of which the number is at most equal to that of the data files on the storage medium, is/are transmitted toward the AV server 102. Particularly if there are multiple data files on the storage medium, then the number of data files transmitted is smaller than the number of data files stored.

Since such a smaller number of data files are managed on the AV server 102, it will be less troublesome for the user to search for data files to play using the player 103 afterward. Also, the data files to aggregate may include moving pictures that have been shot relatively recently, e.g., multiple files of moving pictures that the user shot on his or her child's field day. By aggregating those files together into a single data file, a series of moving pictures, of which the contents are closely associated with each other, can be played back continuously, thus making this recorder come in handier for the user.

In this preferred embodiment, on sensing itself be mounted on the cradle 99, the camcorder 100 performs processing to get ready to transmit the data file(s) toward the AV server 102. However, this processing to get ready for transmission may be carried out only when a status in which no video or audio recording operation has been performed for a while (which status will be referred to herein as a "non-recording status") is detected. For example, on sensing that no recording operation has been performed for at least a certain amount of time, the camcorder 100 may detect the non-recording status.

Optionally, the cradle 99 may be connected to the network 101. In that case, the camcorder 100 does not have to have the network adapter itself.

Figure 2:
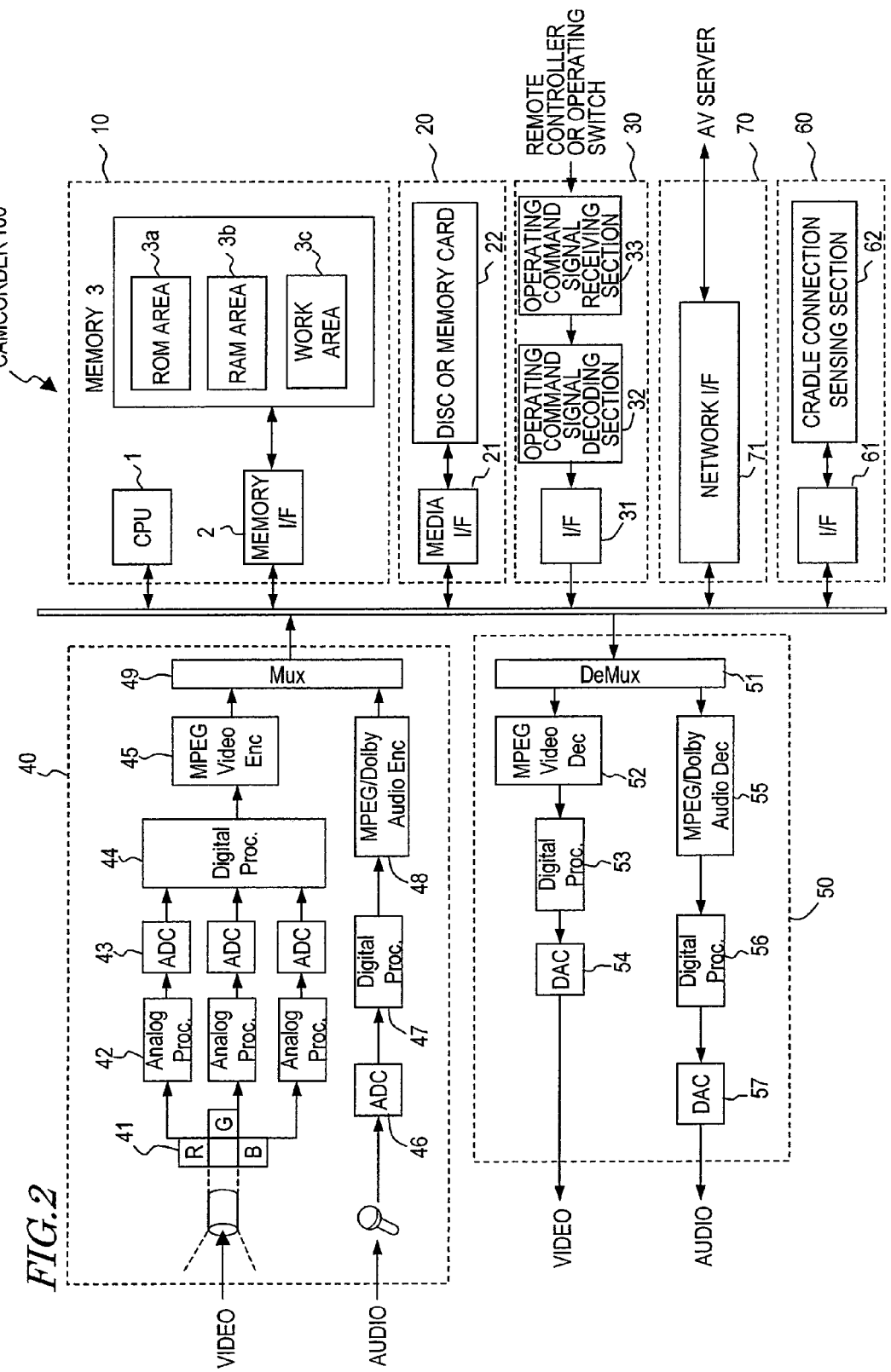
FIG. 2 illustrates a hardware configuration for the camcorder 100.

FIG. 2 illustrates a hardware configuration for the camcorder 100 of this preferred embodiment. The camcorder 100 includes a control unit 10, a read/write unit 20, an operating command receiving unit 30, an encoding unit 40, a decoding unit 50, a cradle connection sensing unit 60, and a network connecting unit 70, all of which are connected together with a bus.

The control unit 10 controls the overall operation of the camcorder 100 and includes a CPU 1, a memory interface (I/F) 2 and a memory 3. The CPU 1 accesses the memory 3 by way of the memory I/F 2. The CPU 1 retrieves a computer program that is stored in the ROM area 3a of the memory 3 and expands it on the RAM area 3b thereof, thereby executing the program. When the program is executed, the work area 3c of the memory 3 may be used if necessary. The control unit 10 also manages the current date and time information.

The operation of the control unit 10 will be described in further detail later with reference to FIG. 5.

The read/write unit 20 includes a media I/F 21 and a storage medium 22. The media I/F 21 writes the data, which has been supplied from another unit (such as the control unit 10 or the encoding unit 40) over the bus, on the storage medium 22. Also, the media I/F 21 reads the data that is stored on the storage medium 22 and outputs it to another unit such as the control unit 10 or the decoding unit 50 over the bus.

The storage medium 22 has the function of storing the data written there. Examples of preferred storage media 22 include magnetic recording media (such as hard disks), optical storage media (such as DVDs and Blu-ray Discs) and semiconductor storage media (such as memory cards). The storage medium 22 may be either built in and non-removable from the camcorder 100 or readily removable from the camcorder 100. In the following description, the storage medium 22 is supposed to be a memory card as an example, and will be referred to herein as a "memory card 22".

The operating command receiving unit 30 receives and processes an operating command signal that the user has sent by tapping on a remote controller or turning a switch. The operating command signal is received by an operating command signal receiving section 33, decoded and analyzed by an operating command signal decoding section 32, and then transferred as a user's command to the control unit 10 by way of an I/F 31. In accordance with the user's command, the control unit 10 controls the camcorder 100. The operating command receiving unit 30 receives instructions on a moving picture recording operation, e.g., an instruction on when to start or stop the recording operation, and then passes them to the control unit 10. Also, the operating command receiving unit 30 further receives instructions concerning the format of the AV data to write, e.g., the number of vertical pixels, the number of horizontal pixels and the video encoding method, and then passes them to the control unit 10.

The encoding unit 40 performs an encoding process when the camcorder 100 is instructed to shoot a moving picture and record its audio. The encoding unit 40 generates video data and audio data through their respective processing routes and then interleaves them together, thereby outputting a data stream.

The video encoding process may be carried out in the following manner. Specifically, the encoding unit 40 decomposes the given video into the three primary colors of light, i.e., red (R), green (G) and blue (B) components, and performs processing on the respective colors. For example, a group of red sensing photodiodes R41 of a CCD senses the color red and outputs an analog video signal. Next, an analog processor 42 subjects the analog video signal to a predetermined type of processing. Then, an analog-to-digital converter (ADC) 43 converts the analog video signal into a digital video signal. Thereafter, a digital processor 44 receives the digital data of the respective color components and subjects them to a predetermined type of processing, thereby generating a baseband video signal. And then an MPEG video encoder 45 performs MPEG encoding on the baseband video signal, thereby generating an encoded video stream as a video elementary stream. It should be noted that the video does not have to be subjected to the MPEG encoding because various other types of video encoding techniques have been developed so far.

Meanwhile, the audio data may be encoded in the following manner. First of all, an analog audio signal is acquired through a microphone. Next, an ADC 46 converts the analog audio signal into a digital audio signal. Thereafter, a digital processor 47 subjects the digital audio signal to a predetermined type of processing, thereby generating a baseband audio signal. And then an MPEG audio encoder 48 encodes the baseband audio signal, thereby generating an encoded audio stream as an audio elementary stream. It should be noted that the audio does not have to be subjected to the MPEG encoding because various other types of audio encoding techniques have been developed so far.

Then, a multiplexer 49 stores the video and audio elementary streams thus generated in packets of a fixed length, interleaves those packets together, and then outputs it as an MPEG stream, which is supplied to the control unit 10 and the read/write unit 20.

The decoding unit 50 decodes the MPEG stream that has been read out from the memory card 22, thereby outputting a moving picture signal and an audio signal. This processing is the opposite of the processing done by the encoding unit 40. A demultiplexer 51 breaks down the given MPEG stream into respective packets according to their types, extracts data from those packets, and outputs a video elementary stream and an audio elementary stream. A video decoder 52 subjects the video elementary stream to MPEG decoding, thereby outputting a baseband video signal. Next, a digital processor 53 subjects the baseband video signal to a predetermined type of processing. And then a digital-to-analog converter 54 converts the signal thus obtained into an analog video signal. As a result, a video signal representing a moving picture can be obtained.

Hereinafter, it will be described exactly how this camcorder 100 operates.

Suppose multiple data files of moving picture data (which will be referred to herein as "AV files") and a single management information file including management information about each of those AV files are stored on the memory card 22. FIG. 3 illustrates AV files #1 (201), #2 (202) and #3 (203) and a management information file 300 that are stored on the memory card 22.

FIG. 4 summarizes various pieces of management information about the AV files #1 (201), #2 (202) and #3 (203), which are stored in the management information file 300. Each set of management information includes information about the formats of the video and audio data of its associated AV file, the recording date and time of that AV file, and a group of flags. In the example illustrated in FIG. 4, each set of management information includes information about the frame rate, scanning method, number of horizontal pixels, and number of vertical pixels of video to be represented by the video data, the respective encoding methods of the video data and the audio data, the date of generation of the file, and three pieces of flag information. In FIG. 4, the date of file creation indicates no specific time. But this is just for sake of simplicity of illustration and the specific time of generation is actually included in the date of file creation.

Hereinafter, it will be described with reference to FIG. 5 how the camcorder 100 operates when the cradle connection sensing section 62 of the cradle connection sensing unit 60 senses the cradle be mounted.

FIG. 5 is a flowchart showing the procedure of operation of the camcorder 100, which stores a computer program, defining the procedure of operation of this flowchart, in the ROM area 3a of the memory 3. The computer program may be either stored on a storage medium such as a CD-ROM or a semiconductor memory or downloaded over a network.

First, when sensing the camcorder 100 be mounted on the cradle 99 in Step S701, the cradle connection sensing section 62 notifies the CPU 1 of that by way of the I/F 61.

The cradle connection sensing section 62 (see FIG. 2) may sense the camcorder 100 be mounted on the cradle 99 by detecting a variation in voltage, a start of charging of the battery (not shown) of the camcorder 100, or hardware switching. Or the cradle connection sensing section 62 may also sense the camcorder 100 be mounted on the cradle 99 in response to the user's press on a button (not shown) on the cradle 99 on which the camcorder 100 has just been mounted. As described above, the camcorder 100 is sensed to be mounted on the cradle 99 during the non-recording status.

The CPU 1 gets information about the current date and time and then reads the contents of the management information file 300 in Step S702. Then, in Step S703, the CPU 1 determines whether or not the aggregation/conversion flag is zero and also determines, by reference to the current date and time information, whether or not there is any file that was generated previously. As used herein, the "aggregation/conversion flag" is a piece of information that is provided for each data file to indicate whether the data file has been subjected to the conversion processing step S704 or the aggregation processing step S706 to be described later. Specifically, supposing the current date is Sep. 10, 2005, AV files #2 (202) and #3 (203) are those previously generated files in the example illustrated in FIGS. 3 and 4. In that case, the CPU 1 determines that there are such files that were generated previously.

If the answer to the query of Step S703 is YES, the process advances to Step S704. Otherwise, the process ends at this point in time.

In Step S704, the CPU 1 converts the formats of that file. For example, the CPU 1 may store in advance information about the formats compatible with the AV server 102 and convert the formats of that file into those formats. The formats to be converted include at least one of the frame rate, scanning method, number of vertical pixels, number of horizontal pixels, and video data encoding method of the video represented by the video data, at least one of the audio data encoding method and the encoding bit rate, and an arbitrary combination thereof.

In this preferred embodiment, the CPU 1 converts the formats of the file such that the frame rate becomes 30 Hz, the scanning method is interlaced scanning, the number of vertical pixels is 1,280, the number of horizontal pixels is 720, the moving picture encoding method is MPEG4-AVC and the audio encoding method is Dolby AC-3.

As a kind of processing for increasing or decreasing the number of pixels, a known down-conversion or up-conversion may be adopted. Also, if the audio data has been compressed and encoded, then the encoding bit rates may also be changed. For example, processing for converting audio data of 768 kbps into audio data of 128 kbps may be carried out.

It should be noted that if there is no need to perform the format conversion processing, the respective processing steps described above do not have to be performed. In this description, however, the present invention is described on the supposition that it is a part of the conversion processing to determine whether or not the format conversion processing should be performed.

Subsequently, in Step S705, the CPU 1 determines whether or not there are at least two other files that were generated previously before the current time. If the answer is YES, the process advances to Step S706. Otherwise, the process advances to Step S707. In this specific preferred embodiment, as there are the AV files #2 (202) and #3 (203) as described above, it is determined that there are at least two other files that were generated previously.

In Step S706, the CPU 1 performs the processing of aggregating multiple target files together. As used herein, "to aggregate" means combining multiple files together. Specifically, in the example illustrated in FIG. 3, the AV files to aggregate are the AV files #2 (202) and #3 (203). Thus, the CPU 1 retrieves these AV files #2 (202) and #3 (203) from the memory card 22, combines those files into a single one, and then writes it back into the memory card 22.

Figure 6:
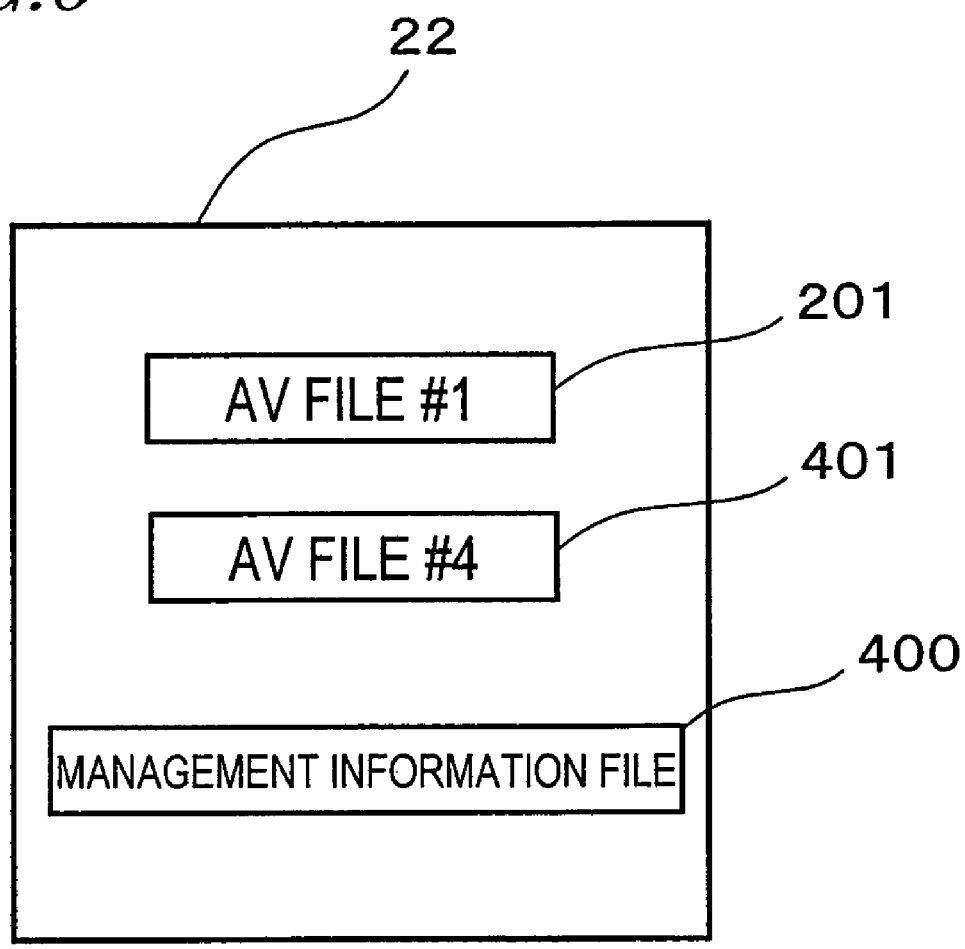
FIG. 6 shows the AV file #4 (401) that has been newly written on the memory card 22 as a result of aggregation processing.

FIG. 6 shows the AV file #4 (401) that has been newly written on the memory card 22 as a result of the aggregation processing. Although the AV files #2 (202) and #3 (203) that were the target of the aggregation processing are deleted in this preferred embodiment once the aggregation is complete, those files could be left as they are if necessary.

In any case, as the state of the AV files stored on the memory card 22 has changed, the CPU 1 needs to update the management information file. Specifically, the CPU 1 not only generates management information for the AV file #4 (401) that has been obtained as a result of the aggregation processing but also deletes the management information of the AV files #2 (202) and #3 (203) that were the targets of the aggregation processing.

FIG. 7 shows exemplary contents of the management information file 400 after the aggregation processing has been performed. As can be seen from FIG. 7, every piece of the management information about the AV file #4 (401) also has the same format as what has already been described for the other AV file #1 (201).

In generating management information for the AV file #4 (401) of the management information file 400, the CPU 1 sets the flag values in Step S707. The AV file #4 (401) has been obtained as a result of the aggregation processing and the conversion processing. That is why the CPU 1 sets the aggregation/conversion flag to "one". However, the AV file #4 (401) has not been uploaded toward the AV server 102 yet. Thus, the CPU 1 sets the upload complete flag to "zero", which indicates that the upload is not complete yet. But as there is an AV file that can be uploaded next time, the CPU 1 sets the uploadability flag to "one".

That is to say, the upload complete flag can be used as a piece of information indicating whether or not the upload is complete (i.e., showing a result of the transmission), while the uploadability flag can be used as a piece of information indicating whether or not a data file is ready to upload.

The AV file #4 (401) that has been obtained as a result of the aggregation processing described above includes the two original contents of the AV files #2 (202) and #3 (203). That is to say, just by selecting only that AV file #4 (401) as the file to upload, substantially two AV files #2 (202) and #3 (203) can be selected. Likewise, by play back just the AV file #4 (401) on the AV server 102, the two AV files #2 (202) and #3 (203) can be played back. As a result, the AV files to upload and the AV files to play can be selected more easily. The greater the number of files to aggregate together, the more significant this effect would be.

Thereafter, the CPU 1 searches for an AV file, of which the uploadability flag is set to be "one" in its management information, to find the AV file #4 (401) is the one, and uploads the AV file #4 (401) toward the AV server 102 in Step S708. After having uploaded that file, the CPU 1 sets the upload complete flag in the management information of the AV file #4 (401) to "one" and sets the uploadability flag thereof to "zero" in Step S709. FIG. 8 shows the contents of the management information file 600, of which the management information has been updated after the AV file #4 (401) has been uploaded.

By uploading the AV file in the format that is compatible with the AV server 102, any player that can play back a content on that AV server 102 can play that moving picture without fail.

In the preferred embodiments described above, the AV file #4 (401) to upload is generated on the memory card 22 and then uploaded. Alternatively, the AV file #4 (401) to upload may also be uploaded while being generated in an internal memory.

As described above, the camcorder 100 of this preferred embodiment can easily combine multiple data files to write into a single file or upload them as a single content, thereby getting selection and playback of a content done more easily.

In the preferred embodiment described above, when the camcorder 100 finds itself be mounted on the cradle 99, the processing shown in FIG. 5 is supposed to be carried out. However, the processing step S702 shown in FIG. 5 and the ones that follow it could also be carried out by sensing the camcorder 100 be connected to the network, instead of finding the camcorder 100 be mounted on the cradle 99.

The network 101 could be either a wide area network such as the Internet or a local area network such as a home LAN. In the latter case, the AV server 102 does not have to be a PC but may also be a consumer electronic device such as an HDD recorder or an optical disc recorder. Furthermore, the network may be either a cabled network or a wireless one.

Optionally, the network may also be a cable that connects the camcorder 100 to the AV server 102 one to one. Examples of preferred cables include a USB cable and an IEEE 1394 cable. In that case, a USB controller or an IEEE 1394 controller detects connection to the network by a known technique.

In the preferred embodiments described above, the CPU 1 is supposed to store information about the format that the AV server 102 is compatible with. However, this is just an example. Alternatively, as for the number of pixels, the user may choose whether he or she likes high definition (HD) video or standard definition (SD) video. Still alternatively, the user may ask the AV server 102 what format it is compatible with and may convert the AV file into the format specified in the answer.

A recorder according to the present invention is applicable for use in camcorders, digital cameras with moving picture shooting function and cellphones. The present invention can also be used in a recorder that records audio data only.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2008-121950 filed on May 8, 2008 and No. 2009-108625 filed on Apr. 28, 2009, the entire contents of which are hereby incorporated by reference.

What is claimed is:

1. A recorder for recording data files, including at least one of video data and audio data, on a storage medium, the recorder comprising:
a status detecting section for sensing that the recorder is in a non-recording status in which the recorder is performing no recording operations;
a processing section for performing, when the non-recording status is detected, processing to get ready to transmit at least one data file, which was recorded on the storage medium at one of a predetermined reference time and a time after the predetermined reference time, toward a server and generating at least one data file to transmit, wherein the processing section performs at least one of format conversion processing and aggregation processing of aggregating multiple data files together;
a recording section for recording the at least one data file to transmit on the storage medium; and
a transmitting section for transmitting the at least one data file to transmit toward the server, wherein
the processing section performs the format conversion processing on the at least one data file as the processing to get ready to transmit the data file toward the server
the processing section changes the formats of the at least one data file into a format compatible with the server, and
the at least one data file includes video data, and wherein the processing section changes the formats of video represented by the video data in at least one of the frame rate, scanning method, number of vertical pixels, number of horizontal pixels, and video data encoding method thereof.

2. The recorder of claim 1, wherein the at least one data file includes multiple data files, and wherein the processing section performs the aggregation processing of aggregating the multiple data files as the processing to get ready to transmit the data files toward the server, thereby generating the at least one data file to transmit, and wherein the number of files included in the at least one data file to transmit is smaller than that of the multiple data files.

3. The recorder of claim 2, wherein the file size of the at least one data file to transmit is smaller than that of multiple data files.

4. The recorder of claim 2, wherein on the storage medium, management information is stored in each of the multiple data files, and wherein the management information includes processing state information indicating whether or not one of the conversion processing and the aggregation processing has been performed on each said data file, and wherein in accordance with the processing state information, the processing section performs the processing on a data file on which neither the aggregation processing nor the conversion processing has been performed to get ready to transmit the data file toward the server.

5. The recorder of claim 4, wherein the management information includes transmission ready information indicating that the data file is ready to be transmitted to the server, and wherein the transmitting section transmits one of the data files, which has been identified by reference to the transmission ready information, toward the server.

6. The recorder of claim 5, wherein the management information includes transmission result information indicating whether or not the data file has been transmitted toward the server successfully, and wherein when one of the data files is transmitted successfully toward the server, the processing section changes the values of the transmission result information about that data file into a value indicating that the transmission is complete.

7. The recorder of claim 1, wherein the reference time is a point in time when the at least one data file was transmitted toward the server last time, and wherein the processing section performs the processing on at least one data file that has been recorded on the storage medium after the previous data file was transmitted toward the server last time to get ready to transmit the at least one data file toward the server.

8. The recorder of claim 1, wherein the at least one data file includes audio data, and wherein the processing section changes the formats of the audio data in at least one of the encoding method and encoding bit rate thereof.

9. The recorder of claim 1, wherein the status detecting section is able to sense the recorder be mounted on a cradle, and wherein on sensing the recorder be mounted on the cradle, the status detecting section determines that the recorder is in the non-recording status.

10. The recorder of claim 1, wherein the status detecting section is able to sense the recorder be connected to a network, and wherein on sensing the recorder be connected to the network, the status detecting section determines that the recorder is in the non-recording status.

11. The recorder of claim 1, further comprising an operating section that allows the user to switch the recorder into the non-recording status, wherein on sensing the operating section be manipulated, the status detecting section determines that the recorder is in the non-recording status.

12. A recorder for recording data files, including at least one of video data and audio data, on a storage medium, the recorder comprising:
    a status detecting section for sensing that the recorder is in a non-recording status in which the recorder is performing no recording operations;
    a processing section for performing, when the non-recording status is detected, processing to get ready to transmit at least one data file, which was recorded on the storage medium at one of a predetermined reference time and a time after the predetermined reference time, toward a server and generating at least one data file to transmit, wherein the processing section performs at least one of format conversion processing and aggregation processing of aggregating multiple data files together;
    a recording section for recording the at least one data file to transmit on the storage medium; and
    a transmitting section for transmitting the at least one data file to transmit toward the server,
    wherein the status detecting section is able to determine whether or not the recorder is performing a recording operation, and wherein on sensing that no recording operation has been performed for a predetermined amount of time, the status detecting section determines that the recorder is in the non-recording status.

13. The recorder of claim 12, wherein the status detecting section is able to sense the recorder be mounted on a cradle, and wherein on sensing the recorder be mounted on the cradle, the status detecting section determines that the recorder is in the non-recording status.

14. The recorder of claim 12, wherein the status detecting section is able to sense the recorder be connected to a network, and wherein on sensing the recorder be connected to the network, the status detecting section determines that the recorder is in the non-recording status.

15. The recorder of claim 12, further comprising an operating section that allows the user to switch the recorder into the non-recording status, wherein on sensing the operating section be manipulated, the status detecting section determines that the recorder is in the non-recording status.

16. The recorder of claim 12, wherein the reference time is a point in time when the at least one data file was transmitted toward the server last time, and wherein the processing section performs the processing on at least one data file that has been recorded on the storage medium after the previous data file was transmitted toward the server last time to get ready to transmit the at least one data file toward the server.

* * * * *